No. 772,158. PATENTED OCT. 11, 1904.
S. B. LANE.
GLOVE FASTENER.
APPLICATION FILED MAY 6, 1903.
NO MODEL.

No. 772,158.

Patented October 11, 1904.

UNITED STATES PATENT OFFICE.

SPENCER B. LANE, OF WATERBURY, CONNECTICUT.

GLOVE-FASTENER.

SPECIFICATION forming part of Letters Patent No. 772,158, dated October 11, 1904.

Application filed May 6, 1903. Serial No. 155,817. (No model.)

*To all whom it may concern:*

Be it known that I, SPENCER B. LANE, a citizen of the United States, residing at Waterbury, in the county of New Haven and State of Connecticut, have invented a new and useful Improvement in Glove-Fasteners; and I do hereby declare the following, when taken in connection with the accompanying drawings and the letters of reference marked thereon, to be a full, clear, and exact description of the same, and which said drawings constitute part of this specification, and represent, in—

Figure 1:
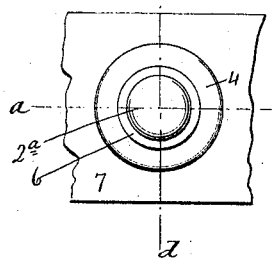
Figure 2:
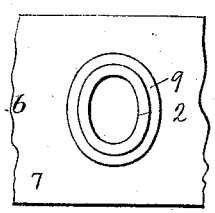
Figure 3:
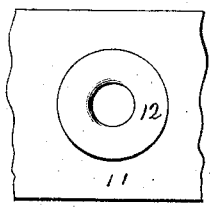
Figure 4:
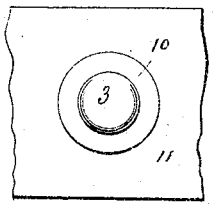
Figure 5:
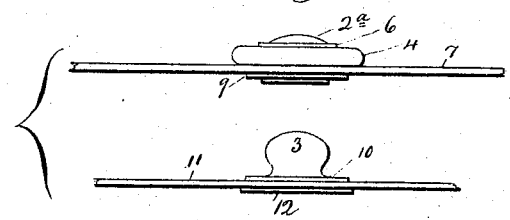
Figure 6:
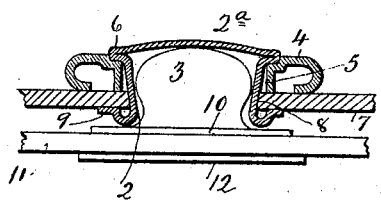
Figure 7:
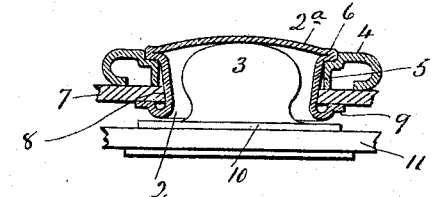
Figure 11:
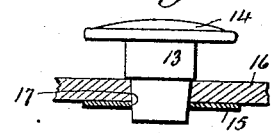
Figure 8:
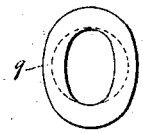
Figure 9:
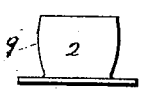
Figure 10:
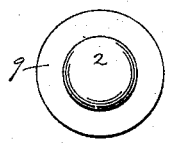
Figure 12:
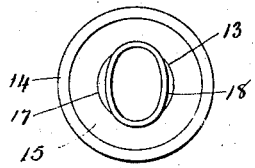

Figure 1, a plan view of one form which the socket member of a glove-fastener containing my invention may assume; Fig. 2, a reverse plan view thereof; Fig. 3, a reverse plan view of one form which the ball member may assume in my improved glove-fastener; Fig. 4, a plan view thereof; Fig. 5, an edge view showing the two members of the glove-fastener separated from each other to show them better; Fig. 6, an enlarged sectional view of the glove-fastener on the line $a\,b$ of Fig. 1, showing the two parts combined; Fig. 7, a similar view on the line $c\,d$ of Fig. 1; Fig. 8, a detached reverse plan view of the socket or eyelet of the fastener; Fig. 9, a view thereof in side elevation; Fig. 10, a plan view thereof; Fig. 11, a view in side elevation of another form of glove-fastener socket member containing my improvement; Fig. 12, a reverse plan view thereof with the fabric removed.

My invention relates to an improvement in glove-fasteners of the well-known ball-and-socket type, the object being to produce at a low cost for manufacture a simple, compact, and effective article adapted to be operated in the ordinary manner by a direct thrust in "buttoning" and a direct pull in "unbuttoning" and constructed with particular reference to reducing the number of parts to the minimum.

With these ends in view my invention consists in a glove-fastener of the ball-and-socket type, the socket member of which has an integral unslitted resilient oval mouth, the longer sides of which yield under the direct thrust or pull of the ball or post member of the fastener in buttoning and unbuttoning the fastener.

In carrying out my invention as shown in Figs. 1 to 10, inclusive, of the drawings I employ a closed-end eyelet or socket, the integral unslitted mouth 2 of the body $2^a$ of which is made oval and a trifle shorter in its minor axis than the largest diameter of the post or ball 3 of the ball member of the fastener. The longer side walls as distinguished from the shorter end walls of the said mouth 2 are made yielding to permit the ball or post 3 to be entered into it and withdrawn from it under a direct thrust or pull, respectively. When the ball has been entered into the said oval mouth, the longer sides of the same recover and hold the ball until the same is pulled away with sufficient power to spring the long side walls of the mouth apart again. This construction avoids the use of spring parts or of slitting either member of the fastener, so as to secure the yielding quality heretofore required for combining or holding the parts together. In the fastener shown I employ an annular chambered sheet-metal washer 4, having a circular central opening 5, through which the closed end of the body $2^a$ is passed, as shown in Figs. 6 and 7, and then upset to form the folded rim 6, which holds the washer 4 down upon the outer face of the fabric 7, which has an opening 8 formed in it for the passage outward through it of the closed end of the socket, the flange 9 of which bears against the lower or inner face of the fabric and the closed end of which is made circular to adapt it to fit into the circular opening 5 of the washer 4. The post or ball 3 is formed in the usual manner with a flange 10 and held in place upon the fabric 11 by means of a closed-end eyelet 12, the closed end of which is passed through the fabric into the post, after which the two are upset and, as it were, crimped together in the usual manner. I do not, however, limit myself to constructing a glove-fastener in the manner above described or in any other manner as long as it is made to contain my improved oval mouth for the reception of the ball or post. Thus in Figs. 11 and 12 of the drawings I have shown a socket or eyelet 13, having its body as well as its mouth made oval in form for the reception of an unyielding ball member of any ordinary construction and not shown. In this device the socket or eyelet 13 is provided with a cap 14 and has the edge of its open end or oval mouth passed through and adapted to be upset (but not shown) over a flat washer 15, located on the opposite side of the fabric 16 and having a circular opening 17, which provides clearance-spaces 18 for the longer sides of the oval mouth to expand into when the said sides are forced apart by the introduction of the post or ball.

Although I have spoken of my improvement as a glove-fastener, it is apparent that it may be used as a garment-fastener and, indeed, in any of the numerous situations in which devices of this character are now utilized. In view of the modification shown and described and of others which may obviously be made I would have it understood that I do not limit myself to such constructions, but hold myself at liberty to make such departures therefrom as fairly fall within the spirit and scope of my invention.

Having fully described my invention, what I claim as new, and desire to secure by Letters Patent, is—

As a new article of manufacture, a glove-fastener of the ball-and-socket type, the socket member of which forms at its mouth an integral, unslitted, oval, resilient part the longer sides of which yield under the direct thrust or pull of the ball or post member of the fastener in "buttoning" and "unbuttoning" the glove-fastener.

In testimony whereof I have signed this specification in the presence of two subscribing witnesses.

SPENCER B. LANE.

Witnesses:
JAMES A. PEASLEY,
BERTHA A. NICHOLS.